United States Patent [19]

Cacho

[11] 4,144,805
[45] Mar. 20, 1979

[54] NUT HULLER AND/OR SHELLER

[76] Inventor: Mike M. Cacho, 706 L. St., Bakersfield, Calif. 93304

[21] Appl. No.: 868,320

[22] Filed: Jan. 10, 1978

[51] Int. Cl.² .............................................. A23N 5/00
[52] U.S. Cl. ...................................... 99/568; 99/580; 366/329
[58] Field of Search ................. 99/571, 569, 574, 580, 99/579, 568; 366/241, 230, 282, 296, 321, 325, 329

[56] References Cited

U.S. PATENT DOCUMENTS

| 505,002 | 9/1893 | Read | 99/579 |
|---|---|---|---|
| 2,270,171 | 1/1942 | Ottaviani | 99/580 |
| 2,506,848 | 5/1950 | Turner | 99/579 |
| 2,669,268 | 2/1954 | Meyer | 99/579 |
| 3,224,739 | 12/1965 | Schur | 366/321 |
| 3,892,388 | 7/1975 | Wass | 366/329 |

Primary Examiner—Edward J. McCarthy
Attorney, Agent, or Firm—Harris, Kern, Wallen & Tinsley

[57] ABSTRACT

A nut huller and/or sheller comprising, in combination, a container with its long axis vertical, a rotatable shaft concentrically mounted within said container, a plurality of radially extending blades mounted on said shaft to form a rotor assembly, said blades being divided into an upper group attached to an upper portion of said shaft in a helix of one direction and a lower group attached to a lower portion of said shaft in a helix of the opposite direction, a means for journaling said shaft in said container, and a means for rotating said rotor assembly.

12 Claims, 4 Drawing Figures

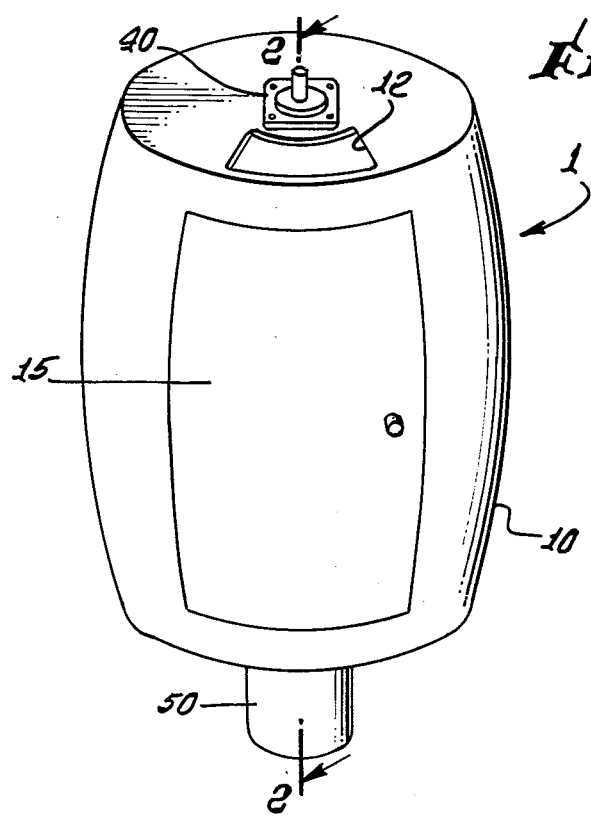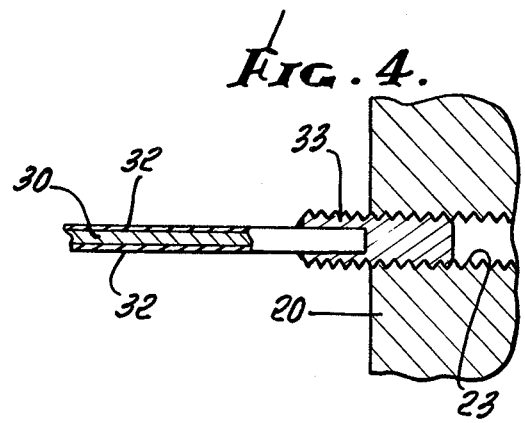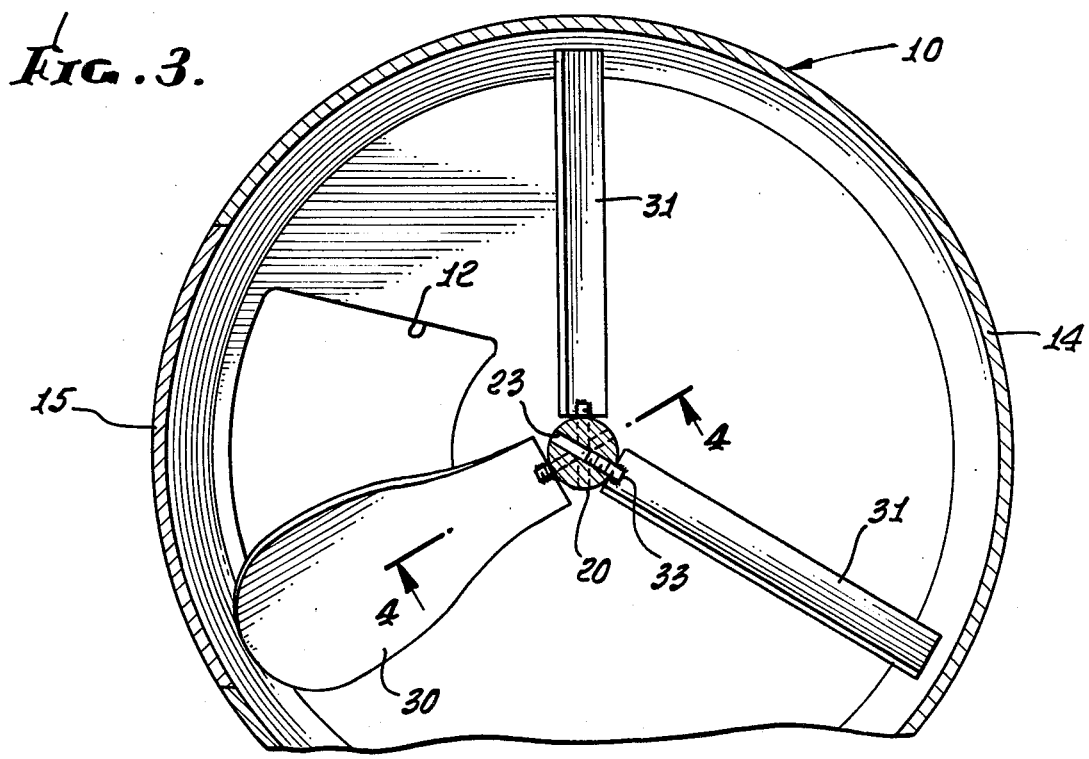

NUT HULLER AND/OR SHELLER

BACKGROUND OF THE INVENTION

The present invention relates in general to an apparatus for removing the hulls and/or shells of nuts, and more particularly to an apparatus for removing both the hull and shell of an almond.

Heretofore, nut shellers have been widely employed, but have several shortcomings. The known nut shellers have not kept the nut means as clean as desired, resulting in a lower grade of product. Many of the prior art devices required a preliminary cracking step prior to shelling.

Patents of interest are: U.S. Pat. No. 493,887 to Gamble for Almond or Walnut Huller; U.S. Pat. No. 505,002 to Read for Almond Hulling and Shelling Machines; U.S. Pat. No. 1,046,466 to Jacobs for Nutcracking Machine; U.S. Pat. No. 1,359,766 to Stephen for Almond Huller; U.S. Pat. No. 2,506,848 to Turner for Nut Sheller; U.S. Pat. No. 2,669,286 to Meyer for Nut Sheller; and U.S. Pat. No. 3,059,678 to Staples for Pecan Cracker.

The most relevant patent in the prior art is U.S. Pat. No. 505,002 to Read. The Read Patent discloses a device for hulling and shelling almonds employing a fixed drum which is placed on its side and having rotating therein a longitudinal shaft with a plurality of spikes arranged in a spiral. The spikes remove the shell and assist in moving the contents through the drum. The drum has a plurality of openings along its lower surface which allow dust and small particles of shell to drop out as the contents of the drum pass over them. Although the angle of incline of the drum may be adjusted by means of a device at one end of the drum, the drum is designed for operation in what is basically a horizontal position. The use of spikes to aid in the movement of the contents of the drum requires a greater amount of power than would be required if the spikes merely removed the hulls and shells of the nuts.

SUMMARY AND OBJECTS OF THE INVENTION

An object of the present invention is to provide a new and improved nut huller and/or sheller. More specifically, an objective of the present invention is to provide a nut huller and/or sheller which is more sanitary and removes both the hull and shell of an almond in a one-step operation.

One feature of the present invention is an elastomeric covering on the exterior surface of the blades.

Another object of the present invention is to provide a nut huller and/or sheller with improved cleanliness.

Another object of the present invention is to provide a nut huller and/or sheller with a greater hulling and/or shelling capacity for a given amount of energy.

In accordance with this invention, these and various other related objectives of the invention, as will be apparent from a detailed consideration of this entire specification, are achieved by a nut huller and/or sheller comprising, in combination, a container having its interior wall in a vertical, cylinder-like shape, a rotatable shaft concentrically mounted within said container, a plurality of radially extending blades mounted on said shaft to form a rotor assembly, said blades being divided into an upper group attached to an upper portion of the shaft in a helix of one direction and a lower group attached to a lower portion of said shaft in a helix of the opposite direction, a means for journaling the shaft in the container, and a means for rotating the rotor assembly.

BRIEF DESCRIPTION OF THE DRAWINGS

This nut huller and/or sheller is intended to be utilized in hulling and/or shelling nuts and is illustrated in the accompanying drawings.

FIG. 1 is a side perspective view of a presently preferred nut huller and/or sheller in accordance with this invention.

FIG. 3 is a cross sectional view from the bottom of the nut huller and/or sheller taken at line 3—3 of FIG. 2.

FIG. 4 is an enlarged, partial cross-sectional view of a blade and shaft taken on line 4—4 of FIG. 3.

Figure 2:
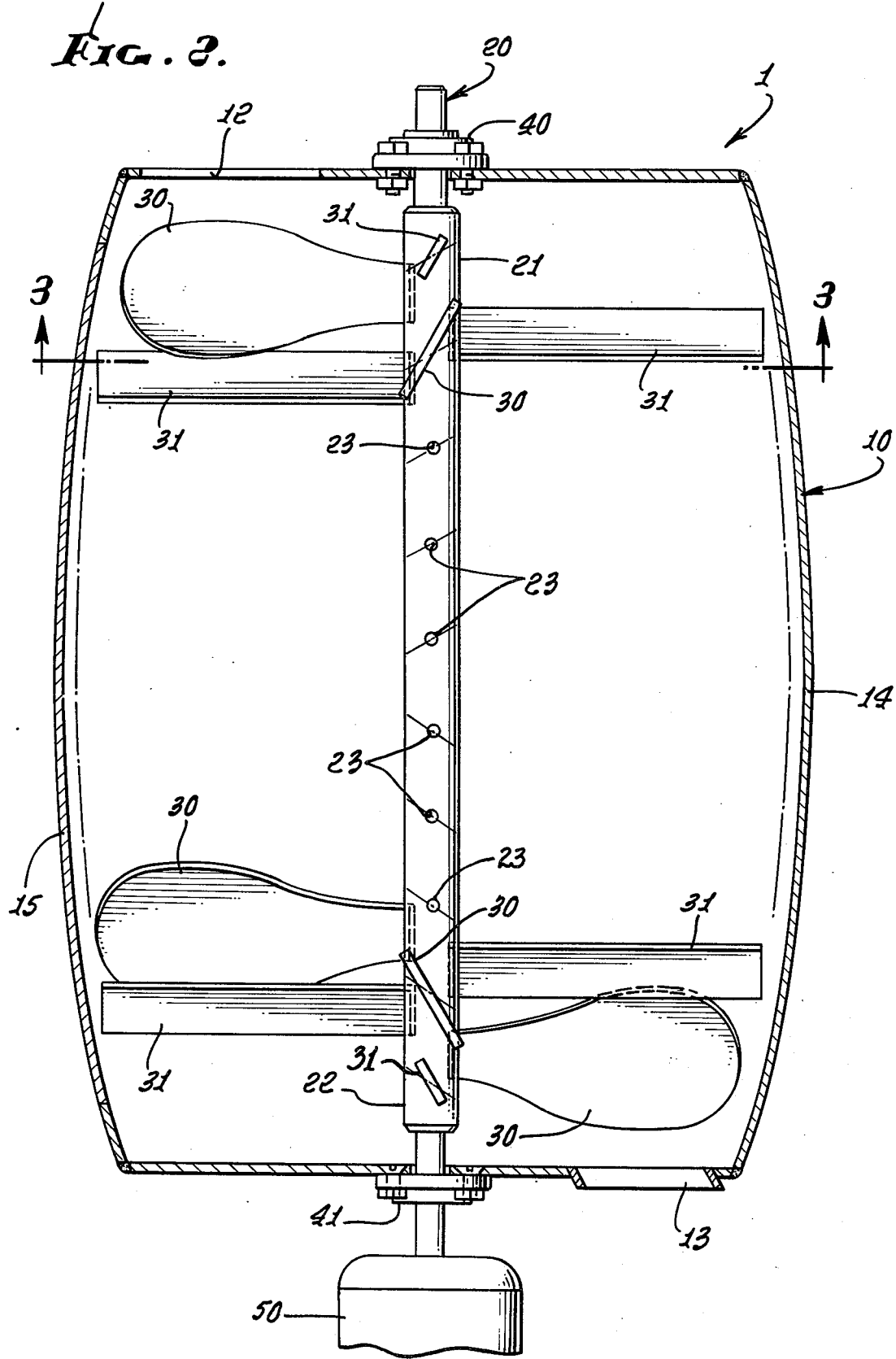
FIG. 2 is a cross-sectional view in the longitudinal direction taken at line 2—2 of FIG. 1.

From a consideration of the remainder of this specification and of the drawings it will be realized that the illustrated nut huller and/or sheller is not the present invention itself, but is a specific structure embodying the essential features or concepts of the present invention. Such features or concepts are defined or summarized in the appended claims. They may be utilized within a number of structures which may differ significantly in appearance from one another.

DESCRIPTION OF THE PREFERRED EMBODIMENT

Illustrated in FIGS. 1 to 4 is a nut huller and/or sheller 1 having a stationary container 10 with an inlet opening 12 located at the top thereof for receiving nuts to be hulled and/or shelled. The container 10 has an outlet opening 13 located at the bottom thereof for discharging the hulls, shells and shelled nuts into a chute (not shown) and an access door 15 located on the side. The container 10 has a vertical interior wall 14 which is in the shape of a figure of revolution and preferably is concave and cylinder-like in shape.

A vertical, rotatable shaft 20 is concentrically mounted within said container 10. The shaft 20 has an upper portion 21 and a lower portion 22. Viewed from the top, the shaft rotates in a clockwise manner at about 250 to 1400 rpm, preferably 750 to 1000 rpm.

A plurality of uniformly spaced, radially extending planar paddle shaped blades 30 and planar straight shaped blades 31 are mounted on the shaft 20 to form a rotor assembly. The blades 30 and 31 are arranged about the shaft 20 with their outermost ends terminating near the interior wall 14 of the container 10, but allowing the rotor assembly to freely rotate. The paddle shaped blades 30 and the straight shaped blades 31 are about equal in number and are further divided into an upper group attached to the upper portion 21 of the shaft 20, and a lower group attached to the lower portion 22 of the shaft 20. The upper group of blades is about 40% of the total number with the balance of the total in the lower group of blades. Both the upper and lower groups of blades alternate paddle shaped blades 30 and straight shaped blades 31. Viewed from the side, the upper group of blades are arranged along a right helix on the upper portion 21 of the shaft 20 at about every 120°. Each of the upper blades is mounted approximately perpendicular to a center line of the shaft 20 and is rotated about the point of attachment in a clockwise manner to form a positive acute angle of about 60° between the blade and the shaft. The lower group of blades are arranged along a helix of the opposite direction (viewed from the side, a left helix) on the lower portion 22 of the shaft 20 at about every 120°. Each of the lower blades is mounted approximately perpendicular to a center line of the shaft 20 and is rotated about the point of attachment in a clockwise manner to form a positive acute angle of about 60° between the blade and the shaft. The individual blades may be arranged along the shaft at intervals of from about 45° to 180°. The individual blades may be rotated from 5° to 85°, preferably 45° to 75°.

If the shaft rotates in the opposite or counterclockwise direction, the blades are rotated about the point of attachment in the opposite or counterclockwise manner to form a negative acute angle of from 5° to 85° between the blade and the shaft, preferably 45° to 75°.

A straight shaped blade 31 is the first or uppermost blade, followed by alternating paddle shaped blades 30 and straight shaped blades 31, with the last blade on the lower portion 22 of the shaft 20 being a straight shaped blade 31. For greater overall clarity, FIGS. 2 and 3 depict the shaft with only a limited number of blades. The shaft illustrated is designed to carry 37 blades in an alternating sequence of straight shaped blades 31 and paddle shaped blades 30 as described above.

The upper portion 21 of the shaft 20 is journaled for rotation in an upper bearing socket 40. The lower portion 22 of the shaft 20 is journaled for rotation in a lower bearing socket 41. A motor 50 is directly coupled to the outer projecting end of the rotor shaft 20. Alternatively, a first sheave may be attached to the outer projecting end of the rotor shaft 20. The first sheave receive a belt trained about a second sheave on the armature shaft of a motor.

It will be noted in FIG. 4 that the blade 30 is detachably attached to the shaft 20 by a threaded shaft 33 located at the base of the blade 30. The threaded shaft 33 is inserted into a threaded socket 23 located in the shaft 20. The blade 30 has an elastomeric material 32 covering its exterior surface.

In operation, the door 15 is closed and the motor 50 is started. The motor 50 is adapted so as to turn the rotor assembly within the container 10 in a clockwise direction. Almonds with hulls and shells are dropped into the inlet opening 12 of the container 10 from a feeding box (not shown) where they encounter the blades 30 and 31 revolving at about 850 rpm whereby the almonds are hulled and shelled. The hulls, shells and shelled almonds pass through the container 10, out the outlet opening 13 and into a chute which catches the almonds. The chute directs the almonds onto a screen which sends them on to conveyor belts for further processing.

The access door 15 allows replacement of a damaged blade, adjustment of a blade, visual inspection of the interior and more thorough cleaning of the interior including the blades and wall. By cleaning the interior of the nut sheller more frequently and more efficiently, a more sanitary shelled nut is obtained.

In an embodiment by way of example, the container 10 is constructed from 17-7 stainless steel. The container 10 has an inner dimension of 32 inches along the vertical axis and a maximum inner diameter of the container of 24 inches at the center, tapering to a minimum inner diameter of 20 inches at both the top and bottom. The inlet opening 12 is about 3 inches radially and about 10 inches across. The outlet opening 13 is about 6 inches radially and about 8 inches across and located at the bottom of the container 10. The access door 15 is 12 inches wide and 28 inches in height and is centered on the side of the barrel opposite the outlet opening 13. A pair of concentric holes at the top and bottom of the container allow a shaft to project through the container at both ends.

The shaft 20 is formed from 1¾ inch 17-7 stainless steel rod stock. The overall length of the shaft is 43 inches, with 4 inches at the top and 7 inches of the bottom of the rod turned down to 1.500 ± 0.005 inch. The lower portion 22 of the shaft 20 terminates with a key slot about ½ inch wide, ⅛ inch deep and 2¼ inches long (not shown). The sockets 23 are formed in a right helix on the upper portion 21 of the shaft 20. The uppermost or top socket is located about 5 inches from the upper end of the shaft with subsequent sockets 23 being spaced at about 1¾ inch centers along a 3 inch lead helix. At a point about 40 percent down the shaft 20, the direction of the helix is reversed and a left helix is used for locating the sockets 23 on the lower portion 22 of the shaft 20. A total of 37 sockets is placed on the shaft 20, arranged along the two helixes. The sockets 23 extend the entire thickness of the shaft 20.

The paddle shaped blade 30 is fabricated from 3/16 inch mild steel plate. The individual blades vary in length from about 7½ to 10 inches, depending upon their location on the shaft. The longest blades are attached in the center portion and the shortest blades are attached at the ends of the shaft. The individual blades are about 2 inches across at their base and flair outwardly in the shape of a paddle to a maximum dimension of about 4 inches at their terminal end. The terminal end is circular, with the circle having a radius of about 2 inches. A ⅜ inch N. C. all-thrd rod, 1¾ inches long, is inserted in the center of the base of the blade for detachable attachment to the shaft 20. The desired angle of rotation about the point of attachment may be achieved by either proper dimensioning or the use of a jam nut (not shown). A vulcanized elastomeric covering of 60 Shore hardness covers the exposed surface of the blades.

The straight shaped blade 31 is fabricated from 3/16 inch by 1½ inch mild steel flat bar stock. These blades vary in length from about 7 to 10 inches. The longest blades are attached in the center portion and the shortest blades are attached at the ends of the shaft. A ⅜ inch N. C. all-thrd rod, about 1¾ inches long, is inserted in the center of the base for detachable attachment to the shaft 20.

A Dodge SC-4 flange bearing is attached at the center of the top of the container 10 to receive the upper end of the shaft 20 and forms an upper bearing 40. A second Dodge SC-4 flange bearng is attached at the center of the bottom of the container 10 to receive the lower end of the shaft 20 and forms a lower bearing 41. Both of the flange bearings are mounted in such a manner that the shaft 20 is concentrically mounted within the container 10. The bolts attaching the lower bearing 41 should be flat-head bolts to allow proper clearance of the last blade.

A 2½ h.p. Sterling Vari-Drive electric motor 50 is directly coupled to the lower end of the shaft 20. This working embodiment of the present invention has a capacity of hulling and shelling about 750 tons of almonds in a 24 hour period.

I claim:

1. A nut huller and/or sheller comprising, in combination:

a container having an inlet opening located at the top thereof for receiving nuts to be hulled and/or shelled, and an outlet opening located at the bottom thereof for discharging the hulls and/or shells and the shelled nuts, said container having its interior wall in a vertical cylinder-like shape;

a vertical, rotatable shaft concentrically mounted within said container, said shaft having an upper and a lower portion;

a plurality of radially extending blades mounted on said shaft to form a rotor assembly, said blades being arranged about said shaft with their outermost ends terminating near said interior wall of said container, but allowing said rotor assembly to freely rotate, said blades being divided into an upper group of blades attached to the upper portion of said shaft in a helix of one direction, and a lower group of blades attached to the lower portion of said shaft in a helix of the opposite direction, said upper group of blades being approximately equal in number to said lower group of blades, each of said blades being mounted approximately perpendicular to the center line of said shaft;

a means for journaling said shaft in said container; and a means for rotating said rotor assembly.

2. The nut huller and/or sheller of claim 1 wherein said blades are paddle shaped blades and straight shaped blades.

3. The nut huller and/or sheller of claim 2 wherein said paddle shaped blades and said straight shaped blades are about equal in number.

4. The nut huller and/or sheller of claim 3 wherein said straight shaped blade is the first blade, followed by alternating paddle shaped blades and straight shaped blades, with the last blade on the shaft being a straight shaped blade.

5. The nut huller and/or sheller of claim 1 wherein said shaft rotates in a clockwise manner when viewed from the top of the container, said upper blades are rotated about their point of attachment in a clockwise manner, when looking toward the shaft, to form a positive acute angle of from about 5° to 85°, and each of said lower blades are rotated about their point of attachment in a clockwise manner, when looking toward the shaft, to form a positive acute angle of from about 5° to 85°.

6. The nut huller and/or sheller of claim 1 wherein said shaft rotates in a counterclockwise manner when viewed from the top of the container, said upper blades are rotated about their point of attachment in a counterclockwise manner, when looking toward the shaft, to form a negative acute angle of from about 5° to 85°, and each of said lower blades are rotated about their point attachment in a counterclockwise manner, when looking toward the shaft, to form a negative acute angle of from about 5° to 85°.

7. The nut huller and/or sheller of claim 1 wherein said blades have an elastomeric material covering their exterior surface.

8. The nut huller and/or sheller of claim 1 wherein each of said blades are detachably attached to said shaft.

9. The nut huller and/or sheller of claim 1 wherein said blades are placed about every 120° around said shaft.

10. The nut huller and/or sheller of claim 1 wherein said interior walls of said container have a concave shape, giving the container its greatest diameter in its mid-section.

11. The nut huller and/or sheller of claim 1 wherein said means for rotating said rotor assembly is a variable speed motor.

12. A nut huller and/or sheller comprising, in combination:

a stationary container having an inlet opening located at the top thereof for receiving nuts to be hulled and/or shelled, and an outlet opening located at the bottom thereof for discharging the hulls and/or shells and the shelled nuts, said container having a vertical interior wall in a concave cylinder-like shape;

a vertical, rotatable shaft concentrically mounted within said container, said shaft having an upper and a lower portion;

a plurality of uniformly spaced, radially extending planar paddle shaped blades and planar straight shaped blades mounted on said shaft to form a rotor assembly, said blades being arranged about said shaft with their outermost ends terminating near said interior wall of said container, but allowing said rotor assembly to freely rotate, said blades being divided into an upper group of blades attached to the upper portion of said shaft in a helix of one direction, and a lower group of blades attached to the lower portion of said shaft in a helix of the opposite direction, said upper group of blades being about 40 percent of the total blades and said lower group about 60 percent of the total blades, said upper group of blades being arranged at about every 120° approximately perpendicular to a center line of said shaft and being rotated about their point of attachment in a clockwise manner when looking toward the shaft to form a positive acute angle of from about 45° to 75° between said blade and said shaft, said lower group of blades being arranged at about every 120° approximately perpendicular to the center line of said shaft being rotated about their point of attachment in a clockwise manner when looking toward the shaft to form a positive acute angle of from about 45° to 75° between said blades and said shaft, said paddle shaped blades and said straight shaped blades being approximatley equal in number, said straight shaped blade being the first or uppermost blade, followed by alternating paddle shaped and straight shaped blades, with the last blade on the shaft being a straight shaped blade, said blades having an elastomeric material covering their exterior surface, said blades being detachably attached to said shaft;

a means for journaling said shaft in said container; and a means for rotating said rotor assembly in a clockwise direction.

* * * * *